(12) United States Patent
Schnieders et al.

(10) Patent No.: US 10,059,345 B2
(45) Date of Patent: Aug. 28, 2018

(54) METHOD FOR OPERATING A MOTOR VEHICLE AND MOTOR VEHICLE FOR CARRYING OUT THE METHOD

(71) Applicant: Continental Automotive GmbH, Hannover (DE)

(72) Inventors: Heiko Schnieders, Schaafheim (DE); Harald Dittmann, Babenhausen (DE)

(73) Assignee: Continental Automotive GmbH, Hannover (DE)

( * ) Notice: Subject to any disclaimer, the term of this patent is extended or adjusted under 35 U.S.C. 154(b) by 153 days.

(21) Appl. No.: 15/029,537

(22) PCT Filed: Oct. 14, 2014

(86) PCT No.: PCT/EP2014/071961
§ 371 (c)(1),
(2) Date: Apr. 14, 2016

(87) PCT Pub. No.: WO2015/055615
PCT Pub. Date: Apr. 23, 2015

(65) Prior Publication Data
US 2016/0251018 A1 Sep. 1, 2016

(30) Foreign Application Priority Data

Oct. 15, 2013 (DE) .................. 10 2013 220 905

(51) Int. Cl.
*G01C 22/00* (2006.01)
*B60W 50/08* (2012.01)
(Continued)

(52) U.S. Cl.
CPC ......... *B60W 50/082* (2013.01); *B60K 26/021* (2013.01); *B60W 30/12* (2013.01);
(Continued)

(58) Field of Classification Search
CPC .... B60W 50/08; B60W 50/16; B60W 30/082; B60W 2050/0096; B60W 30/12;
(Continued)

(56) References Cited

U.S. PATENT DOCUMENTS 9,229,453 B1 * 1/2016 Lee ..................... G05D 1/0214
9,269,270 B2 2/2016 Fehse et al.
(Continued)

FOREIGN PATENT DOCUMENTS

| CN | 102196956 | 9/2011 |
|---|---|---|
| CN | 102556032 | 7/2012 |

(Continued)

*Primary Examiner* — Hussein Elchanti
(74) *Attorney, Agent, or Firm* — Cozen O'Connor

(57) ABSTRACT

A method for guiding a motor vehicle includes: guiding, in a first operating mode, the motor vehicle in an automated manner by a driver assistance system; subsequently guiding, in a second operating mode, the motor vehicle in a nonautomated fashion by a driver; and transitioning from the first operating mode to the second operating mode by adjusting, by a pedal actuator, a gas pedal of the motor vehicle such that at a beginning of the second operating mode, the gas pedal assumes a transfer pedal position that corresponds to the vehicle movement of the motor vehicle at the end of the first operating mode.

7 Claims, 2 Drawing Sheets

(51) Int. Cl.
*B60W 50/16* (2012.01)
*B60K 26/02* (2006.01)
*B60W 30/12* (2006.01)
*B60W 30/16* (2012.01)
*B60W 50/00* (2006.01)

(52) U.S. Cl.
CPC ............ *B60W 30/16* (2013.01); *B60W 50/08* (2013.01); *B60W 50/16* (2013.01); *B60K 2026/026* (2013.01); *B60W 2050/0096* (2013.01)

(58) Field of Classification Search
CPC ... B60W 30/16; B60W 50/082; B60K 26/021; B60K 2026/026
See application file for complete search history.

(56) References Cited

U.S. PATENT DOCUMENTS

| | | | | |
|---|---|---|---|---|
| 2007/0142995 | A1* | 6/2007 | Wotlermann | B60K 31/0008 701/96 |
| 2007/0198145 | A1* | 8/2007 | Norris | B60T 7/22 701/23 |
| 2009/0306835 | A1 | 12/2009 | Ellermann et al. | |
| 2010/0246889 | A1* | 9/2010 | Nara | G06K 9/00798 382/104 |
| 2011/0010094 | A1* | 1/2011 | Simon | B60W 30/16 701/301 |
| 2011/0032119 | A1 | 2/2011 | Pfeiffer et al. | |
| 2011/0190972 | A1* | 8/2011 | Timmons | G01C 21/34 701/31.4 |
| 2011/0245992 | A1 | 10/2011 | Stahlin et al. | |
| 2012/0101713 | A1* | 4/2012 | Moshchuk | B60W 10/184 701/301 |
| 2012/0123644 | A1 | 5/2012 | Waldmann | |
| 2012/0173067 | A1* | 7/2012 | Szczerba | G02B 27/01 701/23 |
| 2013/0046431 | A1 | 2/2013 | Becker et al. | |
| 2013/0110369 | A1 | 5/2013 | Breu | |
| 2013/0226407 | A1* | 8/2013 | Rentschler | G08G 1/166 701/41 |
| 2013/0314503 | A1* | 11/2013 | Nix | G06K 9/00805 348/46 |
| 2014/0088814 | A1* | 3/2014 | You | G05D 1/0061 701/23 |
| 2015/0006028 | A1 | 1/2015 | Strauss | |
| 2015/0291216 | A1* | 10/2015 | Sato | B60W 50/14 701/23 |

FOREIGN PATENT DOCUMENTS

| | | |
|---|---|---|
| CN | 102756731 | 10/2012 |
| DE | 102007035424 A1 | 1/2009 |
| DE | 102009006976 A1 | 8/2009 |
| DE | 102009041361 A1 | 5/2010 |
| DE | 102010001368 A1 | 8/2011 |
| DE | 102010039158 A1 | 2/2012 |
| DE | 102010042048 A1 | 4/2012 |
| DE | 102010062373 A1 | 6/2012 |
| DE | 102012101686 A1 | 9/2013 |
| EP | 21304023 B1 | 12/2009 |
| JP | 2000-054860 | 2/2000 |
| JP | 2006-143120 | 6/2006 |
| JP | 2009-035250 | 2/2009 |
| JP | 2013-517980 | 5/2013 |

* cited by examiner

METHOD FOR OPERATING A MOTOR VEHICLE AND MOTOR VEHICLE FOR CARRYING OUT THE METHOD

CROSS-REFERENCE TO RELATED APPLICATIONS

This is a U.S. national stage of application No. PCT/EP2014/071961, filed on 14 Oct. 2014, which claims priority to the German Application No. 10 2013 220 905.3 filed 15 Oct. 2013, the content of both incorporated herein by reference.

BACKGROUND OF THE INVENTION

1. Field of the Invention

The invention relates to a method for guiding a motor vehicle.

Various methods for the automated guidance of motor vehicles occupied by a driver are already known. The methods are distinguished according to their level of automation, with a distinction for the methods depending on the level of automation being specified by the Federal Highway Research Institute of the Federal Republic of Germany, for example, which distinction is also used in the present patent application.

2. Related Art

Accordingly, a method for highly automated guidance of a motor vehicle involves a driver assistance system taking over the transverse and longitudinal guidance of the motor vehicle for a certain period in specific situations. A method for fully automated guidance of a motor vehicle involves a driver assistance system taking over the transverse and longitudinal guidance of the motor vehicle completely in a defined instance of application. In the case of fully automated guidance, before leaving the instance of application, the driver assistance system prompts the driver, with a sufficient time reserve, to take over the task of driving, that is to say guidance of the motor vehicle. In the case of highly automated guidance, the prompt to take over is provided as required and with a sufficient time reserve. To take over the task of driving, the driver must in both cases, that is to say both in the case of highly automated guidance and in the case of fully automated guidance of the motor vehicle by the driver assistance system, be ready to take over each time. Highly or fully automated guidance of the motor vehicle is also referred to as guiding the motor vehicle at a higher level of automation.

In both aforementioned cases, highly automated guidance and fully automated guidance of the motor vehicle, the driver does not have to monitor the driver assistance system.

By contrast, the driver has to monitor the driver assistance system on an ongoing basis in the case of methods with a lower level of automation, namely a method for semiautomated guidance of a motor vehicle by a driver assistance system or a method for only assisted guidance of the motor vehicle by a driver assistance system. Both semiautomated guidance of the motor vehicle by the driver assistance system and only assisted guidance of a motor vehicle by the driver assistance system require the driver to be ready to take over vehicle guidance completely at any time.

A method for semiautomated guidance of the motor vehicle by the driver assistance system involves the driver assistance system taking over the transverse and longitudinal guidance of the motor vehicle for a certain period or in specific situations. A method for assisted guidance of the motor vehicle by the driver assistance system involves the driver carrying out either transverse control or longitudinal control on an ongoing basis; the other driving task in each case is carried out by the driver assistance system within certain limits.

Particularly when the motor vehicle is longitudinally guided in automated fashion by a driver assistance system, there is the risk of an undesirable change of speed for the motor vehicle on a transition to guidance of the motor vehicle with nonautomated longitudinal guidance.

SUMMARY OF THE INVENTION

It is an object of the invention to specify a method that affords a fluid transition from automated to nonautomated guidance of the motor vehicle. In addition, it is an object of the invention to provide a motor vehicle for carrying out such a method.

The first object is achieved by a method of the type in that the transition from a first operating mode (or operation), in which the automobile is guided in automated fashion by a drive assistance system, to a second operating mode (or operation), in which the automobile is guided in a non automated fashion by the driver, involves a gas pedal of the motor vehicle being adjusted by a pedal actuator such that at the beginning of the second operating mode, the gas pedal assumes a transfer pedal position that corresponds to the vehicle movement of the motor vehicle at the end of the first operating mode. The second operating mode of the method according to an aspect of the invention follows the first operating mode, preferably directly.

An aspect of the invention therefore relates to a method in which the first operating mode involves the motor vehicle being at least longitudinally guided in automated fashion. Also provided, according to one aspect, is a method in which the motor vehicle is at least longitudinally guided in a first operating mode only in a manner assisted by the driver assistance system within certain limits. Preferably, a method is provided in which the first operating mode involves the motor vehicle being guided in fully automated or highly automated or semiautomated fashion.

The second operating mode involves the motor vehicle being at least longitudinally guided in nonautomated fashion by the driver. Subsequently, automated guidance of the motor vehicle fundamentally denotes at least automated longitudinal guidance of the motor vehicle, and nonautomated guidance of the motor vehicle fundamentally denotes at least nonautomated longitudinal guidance of the motor vehicle.

A particular advantage of the invention is that the driver takes over the gas pedal precisely in the position that the gas pedal would assume if the motor vehicle had already been guided in nonautomated fashion, that is to say without the influence of a driver assistance system longitudinally guiding the motor vehicle, by the driver in the first operating mode. The pedal actuator is used to adjust the gas pedal independently of the driver.

The transfer pedal position corresponds to the vehicle movement, particularly to the vehicle longitudinal movement, of the motor vehicle at the end of the first operating mode. The transfer pedal position is therefore dependent, by way of example, on a speed of the motor vehicle, on a transmission gear of a transmission system of the motor vehicle, on a route gradient on which the motor vehicle travels and on a road condition of a road on which the motor vehicle travels, specifically in each case at the time at the end of the first operating mode. To put it another, the transfer pedal position corresponds with the loading condition of the vehicle drive motor of the motor vehicle at the time at the end of the first operating mode. The transfer pedal position of the gas pedal is the position of the gas pedal that the gas pedal would assume at a time at the end of the first operating mode if the motor vehicle were longitudinally guided in nonautomated fashion, that is to say if the gas pedal were operated by the driver for the same vehicle movement at this time.

As a result, the driver can advantageously take over the pedal position set by the pedal actuator, namely the transfer pedal position, directly in order to guide the motor vehicle in nonautomated fashion from then on—in the second operating mode. Such aspects of the invention involve neither undesirable deceleration of the motor vehicle nor undesirable acceleration of the motor vehicle when the nonautomated, that is to say manual, vehicle guidance is taken over by the driver. Similarly, undesirable jolting of the motor vehicle during this takeover is avoided. The driver can use the method according to the invention to advantageously take over the position of the gas pedal quickly and conveniently without a change of speed. There is advantageously no "overdrive" (positive acceleration) and also no negative acceleration (drag torque).

Adjustment of the gas pedal by the pedal actuator is preferably effected exclusively when the motor vehicle is guided in automated fashion by the driver assistance system. The adjustment of the gas pedal by the pedal actuator is preferably adjustment by electric motor. If the motor vehicle is guided in nonautomated fashion by the driver, there is preferably no adjustment of the gas pedal by the pedal actuator. The pedal actuator is preferably inactive when the motor vehicle is guided in nonautomated fashion by the driver.

Additional advantageous developments of the invention are specified in the subclaims.

It will be possible to envisage the gas pedal being adjusted by the pedal actuator during the whole first operating mode such that the position of the gas pedal corresponds with a current actual vehicle movement in each case, for example. By contrast, it is of particular advantage if, according to one development of the invention, the first operating mode comprises a transfer phase that ends with the beginning of the second operating mode and if during the transfer phase, the gas pedal is adjusted from a pedal rest position to the transfer pedal position by the pedal actuator. Hence, during the first operating mode, in which the motor vehicle is guided in automated fashion, the gas pedal is primarily in the position of rest, so that there is firstly additional space freed in the foot well of the motor vehicle and unintentional operation of the gas pedal by the driver is prevented, and secondly continual movement of the gas pedal, which may disturb vehicle occupants of the motor vehicle and places a strain on the pedal actuator, is avoided.

The transfer phase is a phase during the method in which nonautomated guidance of the motor vehicle is prepared for. The transfer phase can cover a time span of, by way of example, a few seconds, for example five to ten seconds.

According to one advantageous development of the invention, during the transfer phase, the gas pedal is adjusted continuously by the pedal actuator in accordance with the vehicle movement, particularly vehicle longitudinal movement, of the motor vehicle. As described above, the vehicle movement is dependent on various influencing factors; that is the position of the gas pedal during the transfer phase corresponds, according to this development of the invention, with the respective loading condition of the vehicle drive motor of the motor vehicle. As a result of the correspondence of the position of the gas pedal with the vehicle movement or with the respective loading condition of the vehicle drive motor during the transfer phase, a foot of the driver that operates the gas pedal during later nonautomated guidance of the motor vehicle can be applied to the gas pedal in the transfer phase itself and, in so being, advantageously pick up the gas pedal movement. In this development of the invention, the respective position of the gas pedal during the transfer phase is thus in each case the position of the gas pedal that the gas pedal would assume in the course of the transfer phase if the motor vehicle were longitudinally guided in nonautomated fashion, that is to say if the gas pedal were operated by the driver for the same vehicle movement during the transfer phase.

It is conceivable for nonautomated guidance of the motor vehicle to be switched on by the driver, for example by virtue of operation of a switch on a steering wheel of the motor vehicle, and for automated guidance of the motor vehicle to be switched off thereby. By contrast, according to one advantageous development of the invention, when the gas pedal is free of pedal pressure, a pedal pressure exerted on the gas pedal switches on the nonautomated guidance of the motor vehicle. At the same time, automated guidance of the motor vehicle is switched off. A gas pedal is free of pedal pressure within the aforementioned context when no external pressure is exerted on the gas pedal. The pedal pressure that is exerted on the gas pedal and brings about switching is preferably exerted on the gas pedal by the driver, specifically particularly by a foot of the driver. Alternatively, provision may be made for a brief, jerky pedal pressure that is exerted on the gas pedal to switch on nonautomated guidance of the motor vehicle; in this case, it is then not absolutely necessary for the gas pedal to be free of pedal pressure beforehand.

It is particularly advantageous if, according to another development of the invention, at the beginning of the second operating mode, there is haptic signaling by the gas pedal to the driver. The haptic signaling indicates that the transition to nonautomated driving has been made. In this manner, the driver is provided with clear information that the motor vehicle now needs to be guided in nonautomated fashion by him, the driver himself, that is to say manually. Preferably, the haptic signaling can comprise vibration of the gas pedal.

It would be possible to envisage a transition from non-automated to automated longitudinal guidance of the motor vehicle involving the gas pedal remaining in its last position brought about by the driver, for example. By contrast, one advantageous development of the invention provides for a operating mode that precedes the first operating mode, preferably precedes it directly, to involve the motor vehicle being guided in nonautomated fashion by the driver and for the gas pedal to be adjusted to the pedal rest position by the pedal actuator at the beginning of the first operating mode. As a result, the gas pedal briefly frees additional space in the foot well of the motor vehicle and subsequently also actually avoids inadvertent operation of the gas pedal by the driver in advance. The gas pedal is adjusted out of a pedal position that corresponds to the vehicle movement, and which the driver had also prompted, at the beginning of the first operating mode. As described above, the vehicle movement (and hence also the position of the gas pedal) is dependent on various influencing factors. In other words, the position of a gas pedal in this case corresponds with the loading condition of the vehicle drive motor of the motor vehicle at the beginning of the first operating mode. The pedal position that corresponds to the vehicle movement at the beginning of the first operating mode is the position of the gas pedal that the gas pedal would assume at this time on the basis of operation of the gas pedal by the driver during nonautomated guidance of the motor vehicle for the same vehicle movement; in this case, the pedal position may particularly be the pedal position prompted by the driver at the end of the preceding operating mode.

The second object above is achieved by a motor vehicle for carrying out an aforementioned method, wherein the motor vehicle has a driver assistance system for automated guidance of the motor vehicle and a gas pedal having a pedal actuator and having an actuator controller for actuating the pedal actuator, wherein the gas pedal can be adjusted by the pedal actuator, which is actuated by the actuator controller, independently of a driver of the motor vehicle. In this case, independently of the driver means that the driver does not operate the gas pedal, that is to say does not exert pressure on the gas pedal. By way of example, the actuator controller may also be arranged in a central controller of the motor vehicle, for example in a controller of the driver assistance system. In particular, the actuator controller may also be functionally integrated in an aforementioned controller of this kind. By way of example, the pedal actuator is actuated by the actuator controller on the basis of the vehicle movement, particularly vehicle longitudinal movement, of the motor vehicle or, to put another way, on the basis of the loading condition of the drive motor of the motor vehicle. Furthermore, the pedal actuator can, by way of example, also be actuated by the actuator controller on the basis of the respective operating mode of an aforementioned method according to the invention, for example in order to adjust the gas pedal to the pedal rest position.

By way of example, the pedal actuator may be a hydraulic actuator or, for example, a pneumatic actuator. To allow the pedal actuator to be able to be controlled and regulated in a particularly good and simple manner and to be manufactured inexpensively, one advantageous development provides, by contrast, for the pedal actuator to be an actuator driven by an electric motor. The pedal actuator then has an electric motor. The electric motor is actuated particularly by the actuator controller, and the gas pedal is adjustable by the pedal actuator electric motor actuated by the actuator controller.

BRIEF DESCRIPTION OF THE DRAWINGS

Exemplary embodiments of the invention are shown schematically in the drawings and are described in more detail below. In the drawings.

DETAILED DESCRIPTION OF THE PRESENTLY PREFERRED EMBODIMENTS

Mutually corresponding elements are provided with the same reference symbols throughout the figures.

Figure 1:
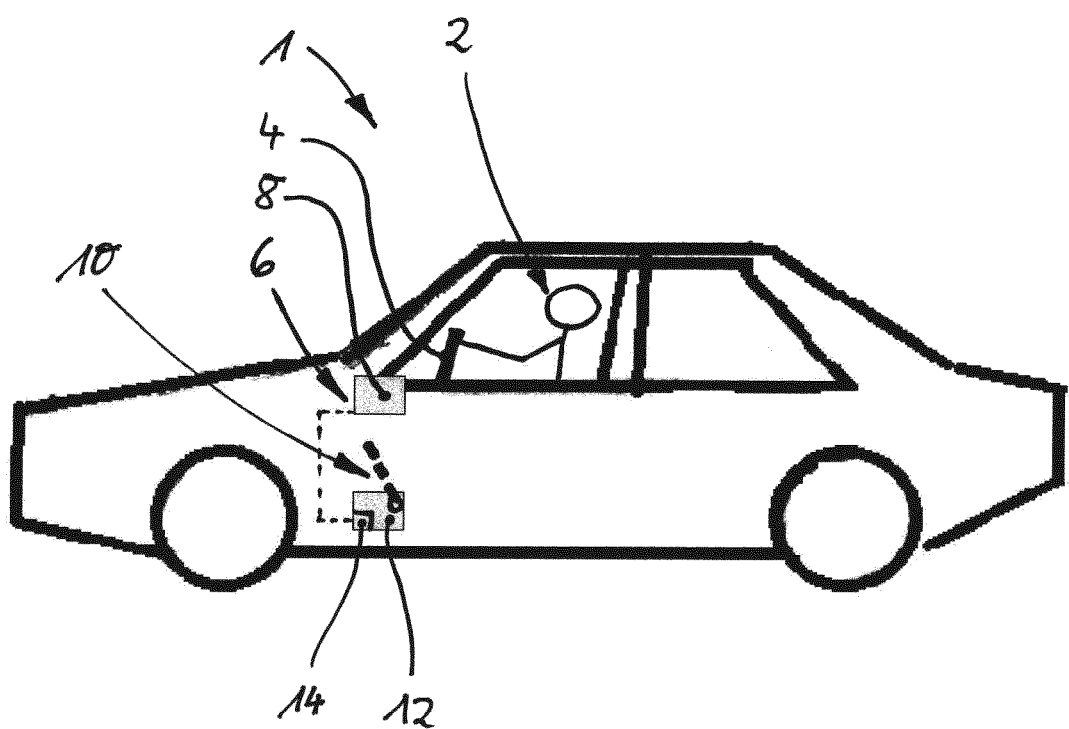
FIG. 1 shows a motor vehicle.

FIG. 1 shows a sketched illustration of a motor vehicle 1 with a driver 2. The motor vehicle 1 has a steering wheel 4 and also a driver assistance system 6, which comprises a controller 8, for automated guidance of the motor vehicle 1. In addition, the motor vehicle 1 has a gas pedal 10 having a pedal actuator 12 and having an actuator controller 14.

By way of example, the actuator controller 14 may be integrated in the pedal actuator 12 or, by way of example, may be integrated in a different controller of the motor vehicle 1, for example in the controller 8 of the driver assistance system 6. In this case, the actuator controller 14 is arranged in the pedal actuator 12 and connected to the controller 8 of the driver assistance system 6, so that information, for example control signals, can be interchanged between the two controllers.

The gas pedal 10 can be adjusted by the pedal actuator 12, which can be actuated by the actuator controller 14, independently of the driver 2 of the motor vehicle 1. In this exemplary embodiment, the pedal actuator 12 is an actuator driven by electric motor. The gas pedal 10 is adjusted by an electric motor, which is not shown further, when the motor vehicle 1 is guided in automated fashion. The gas pedal 10 is adjusted by the pedal actuator 12 at least to a transfer pedal position for the driver 2 to take over guidance, particularly longitudinal guidance, of the motor vehicle 1.

A method for guiding the motor vehicle 1 shown in FIG. 1 is described in more detail below with reference to FIGS. 2 to 8. To this end, FIGS. 3 to 8 each show a foot 16 of the driver 2 and the gas pedal 10 in different positions in sketch form.

Figure 2:
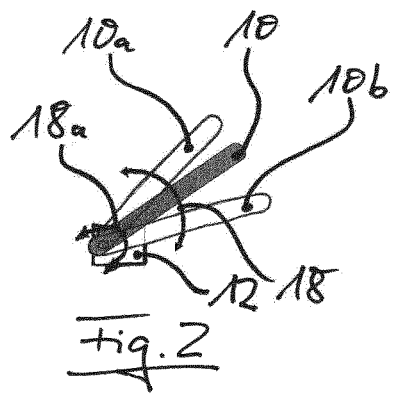
FIGS. 2 to 8 each show a gas pedal of the motor vehicle shown in FIG. 1 in different pedal positions.

FIG. 2 shows the gas pedal 10 when the motor vehicle 1 is guided in automated fashion by means of the driver assistance system 6 during a first operating mode. According to this exemplary embodiment, the gas pedal 10 is then adjusted by means of the pedal actuator 12 in accordance with a current vehicle longitudinal movement of the motor vehicle 1, as illustrated by two double-headed arrows 18, 18a; in this case, the gas pedal 10 can assume both higher positions, as represented using a gas pedal 10a shown by way of example in a higher position, and lower positions, as represented using a gas pedal 10b shown by way of example in a lower position. Alternatively, the gas pedal 10 could also be in a pedal rest position (cf. FIG. 8).

Figure 3:
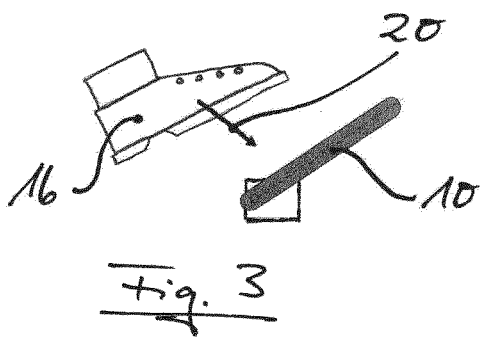

Following the first operating mode, a second operating mode involves the motor vehicle 1 being guided in nonautomated fashion by the driver 2. FIG. 3 shows a situation during a transfer phase at the end of the first operating mode, which transfer phase ends with the beginning of the second operating mode. In this case, the driver 2 moves a foot 16 toward the gas pedal 10 in the direction of an arrow 20.

Figure 4:
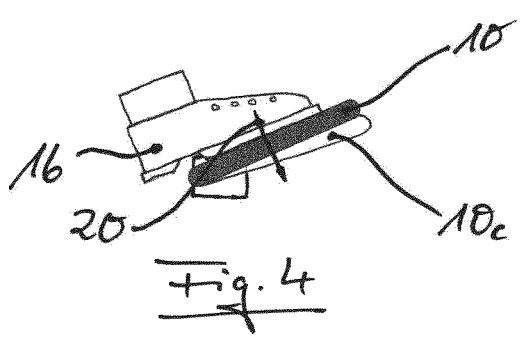

As FIG. 4 shows, the driver 2 subsequently places the foot 16 on the gas pedal 10 and takes over the last position of the gas pedal 10 that it assumed during automated guidance of the motor vehicle 1, the transfer pedal position of the gas pedal 10. The driver 2 then guides the motor vehicle 1 in non-automated fashion and depresses the gas pedal 10 to a lower position in the direction of an arrow 20, for example, as represented using a gas pedal 10c shown in a lower position.

Figure 5:
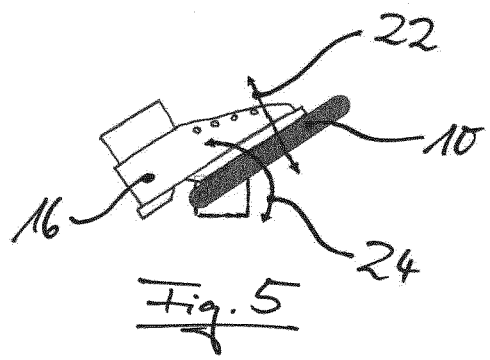

The driver 2 then guides the motor vehicle 1 manually, that is to say in nonautomated fashion, and to this end moves the foot 16 up or down, as symbolized by a double-headed arrow 22 in FIG. 5. Accordingly, the gas pedal 10 is moved in the corresponding direction of a double-headed arrow 24 by the foot 16. The gas pedal 10 is not adjusted by the pedal actuator 12 in this case.

Figure 6:
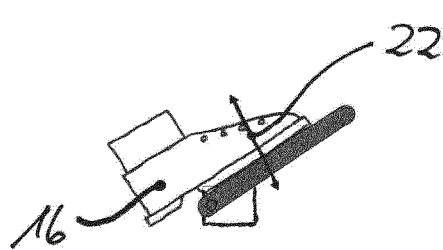
Figure 7:
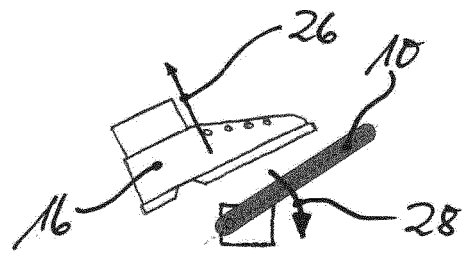

A representation corresponding to FIG. 5 is also shown by FIG. 6, which FIG. 6 shows a situation during an operating mode that precedes the first operating mode in which the motor vehicle 1 is likewise guided in nonautomated fashion by the driver 2. At the beginning of the first operating mode, described above, in which the motor vehicle 1 is guided in automated fashion by the driver assistance system 6, the driver 2 takes the foot 16 from the gas pedal 10 in the direction of an arrow 26 as shown by the illustration in FIG. 7. In this case, the gas pedal 10 is in a pedal position that corresponds to the vehicle movement, particularly the vehicle longitudinal movement, of the motor vehicle 1, and, according to this exemplary embodiment, is adjusted from the aforementioned pedal position to a pedal rest position by the pedal actuator 12, as symbolized in this case by a downward pointing arrow 28.

Figure 8:
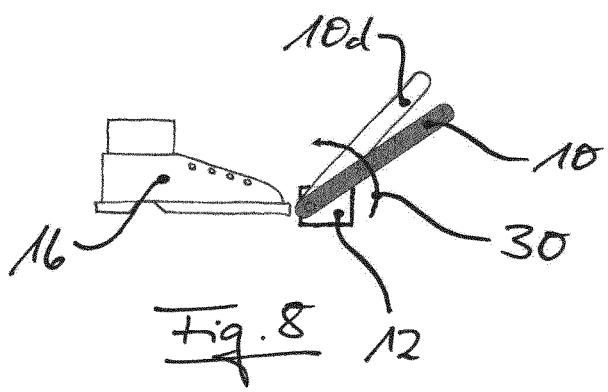

FIG. 8 shows the gas pedal 10 in a pedal rest position; the foot 16 of the driver 2 is at rest in a foot well, not shown further, of the motor vehicle 1. FIG. 8 shows a situation in a transfer phase of the first operating mode, which transfer phase ends with the beginning of the second operating mode, as described above with reference to FIG. 3.

According to the exemplary embodiment shown in FIG. 8, during the transfer phase of the first operating mode, the gas pedal 10 is adjusted by the pedal actuator 12 from the pedal rest position to a transfer pedal position, in which the driver 2 can seamlessly take over the gas pedal for nonautomated guidance of the motor vehicle 1, in the direction of an arrow 30, as represented using a gas pedal 10d shown by way of example in a higher position.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for guiding a motor vehicle (1), comprising:
guiding, in a first operating mode, the motor vehicle (1) in an automated manner by a driver assistance system (6);
subsequently guiding, in a second operating mode, the motor vehicle (1) in a nonautomated fashion by a driver (2); and
transitioning from the first operating mode to the second operating mode by adjusting, by a pedal actuator (12), a gas pedal (10) of the motor vehicle (1) such that at a beginning of the second operating mode, the gas pedal (10) assumes a transfer pedal position that corresponds to the vehicle movement of the motor vehicle (1) at the end of the first operating mode,
wherein the first operating mode comprises a transfer phase that ends with the beginning of the second operating mode, and the method further comprises:
adjusting, during the transfer phase, by the pedal actuator (12), the gas pedal (10) from a pedal rest position to the transfer pedal position, the transfer pedal position, at any given point in time during the transfer phase, being the position the gas pedal (10) would have occupied if the motor vehicle would have been operated in the nonautomated fashion by the driver during the transfer phase.

2. The method as claimed in claim 1, further comprising:
continuously adjusting, during the transfer phase, by the pedal actuator (12), the gas pedal (10) in accordance with the vehicle movement of the motor vehicle (1).

3. The method as claimed in claim 1, further comprising:
exerting, when the gas pedal (10) is free of pedal pressure, a pedal pressure on the gas pedal (10) to switch on the nonautomated guidance of the motor vehicle (1).

4. The method as claimed in claim 1, further comprising:
providing, at the beginning of the second operating mode, by the gas pedal (10), haptic signaling to the driver (2).

5. The method as claimed in claim 1, further comprising:
guiding, in a third operating mode that precedes the first operating mode, the motor vehicle (1) in nonautomated fashion by the driver (2); and
adjusting, by the pedal actuator (12), the gas pedal (10) to the pedal rest position at the beginning of the first operating mode.

6. A motor vehicle (1) comprising:
a driver assistance system (6) configured to provide automated guidance of the motor vehicle (1); and
a gas pedal (10) having:
a pedal actuator (12), and
an actuator controller (14) configured to actuate the pedal actuator (12),
wherein the gas pedal (10) is adjustable by the pedal actuator (12) independently of a driver (2) of the motor vehicle (1), the pedal actuator (12) being actuatable by the actuator controller (14),
wherein the driver assistance system (6) and the gas pedal (10) are configured to:
guide, in a first operating mode, the motor vehicle (1) in an automated manner by the driver assistance system (6);
permit subsequent guiding, in a second operating mode, of the motor vehicle (1) in a nonautomated fashion by a driver (2); and
transition from the first operating mode to the second operating mode by adjusting, by the pedal actuator (12), the gas pedal (10) of the motor vehicle (1) such that at a beginning of the second operating mode, the gas pedal (10) assumes a transfer pedal position that corresponds to the vehicle movement of the motor vehicle (1) at the end of the first operating mode,
wherein the first operating mode comprises a transfer phase that ends with the beginning of the second operating mode, and wherein the driver assistance system (6) and the gas pedal (10) are further configured to:
adjust, during the transfer phase, by the pedal actuator (12), the gas pedal (10) from a pedal rest position to the transfer pedal position, the transfer pedal position, at any given point in time during the transfer phase, being the position the gas pedal (10) would have occupied if the motor vehicle would have been operated in the nonautomated fashion by the driver during the transfer phase.

7. The motor vehicle as claimed in claim 6, wherein the pedal actuator (12) is drivable by an electric motor.

* * * * *